Figure 1:
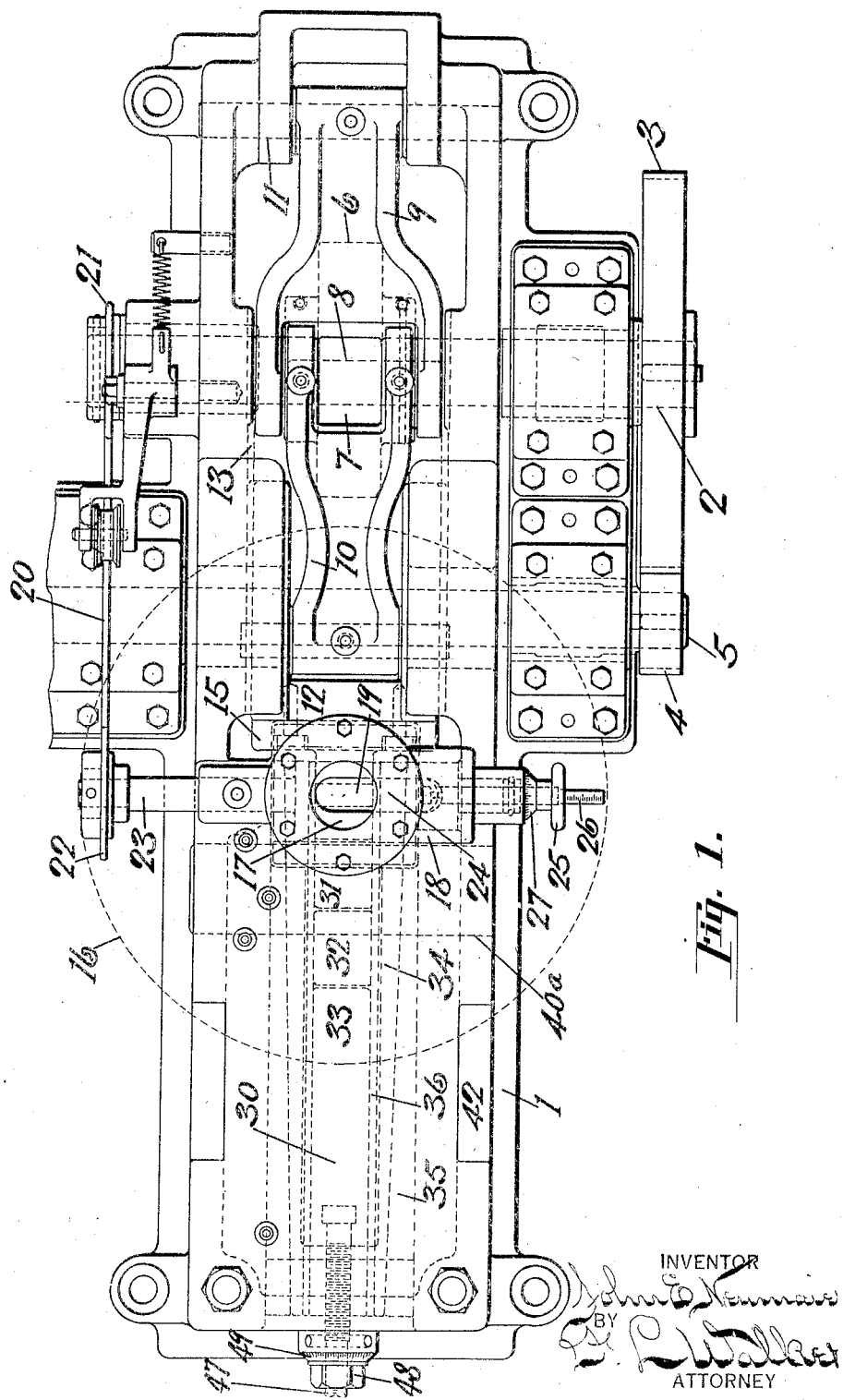

Oct. 2, 1923.

J. E. NEUMAIER

MOLDING PRESS

Filed Feb. 1, 1922

1,469,429

6 Sheets-Sheet 1

Oct. 2, 1923.

J. E. NEUMAIER

MOLDING PRESS

Filed Feb. 1, 1922    6 Sheets-Sheet 4

1,469,429

INVENTOR
John E. Neumaier
BY
ATTORNEY

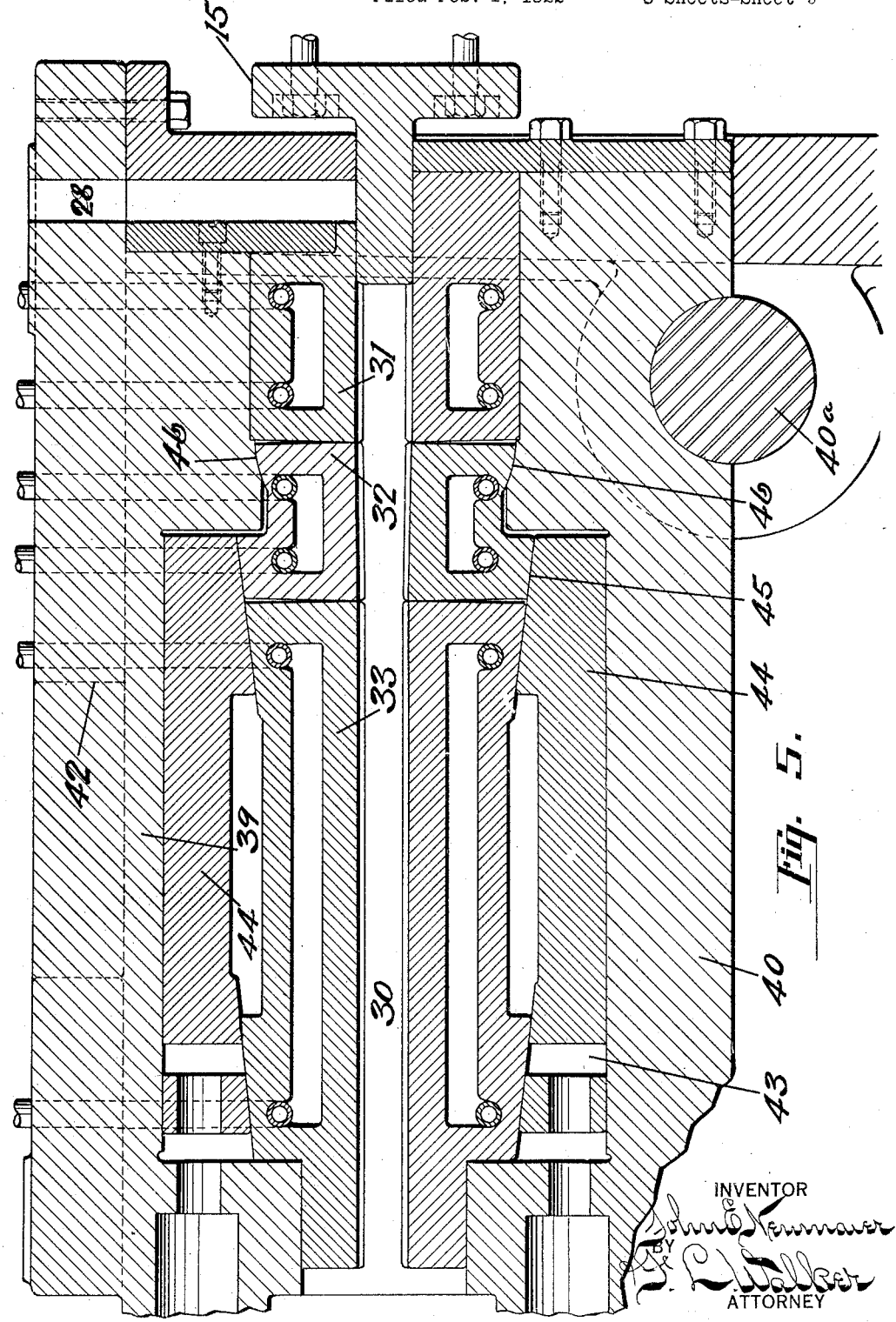

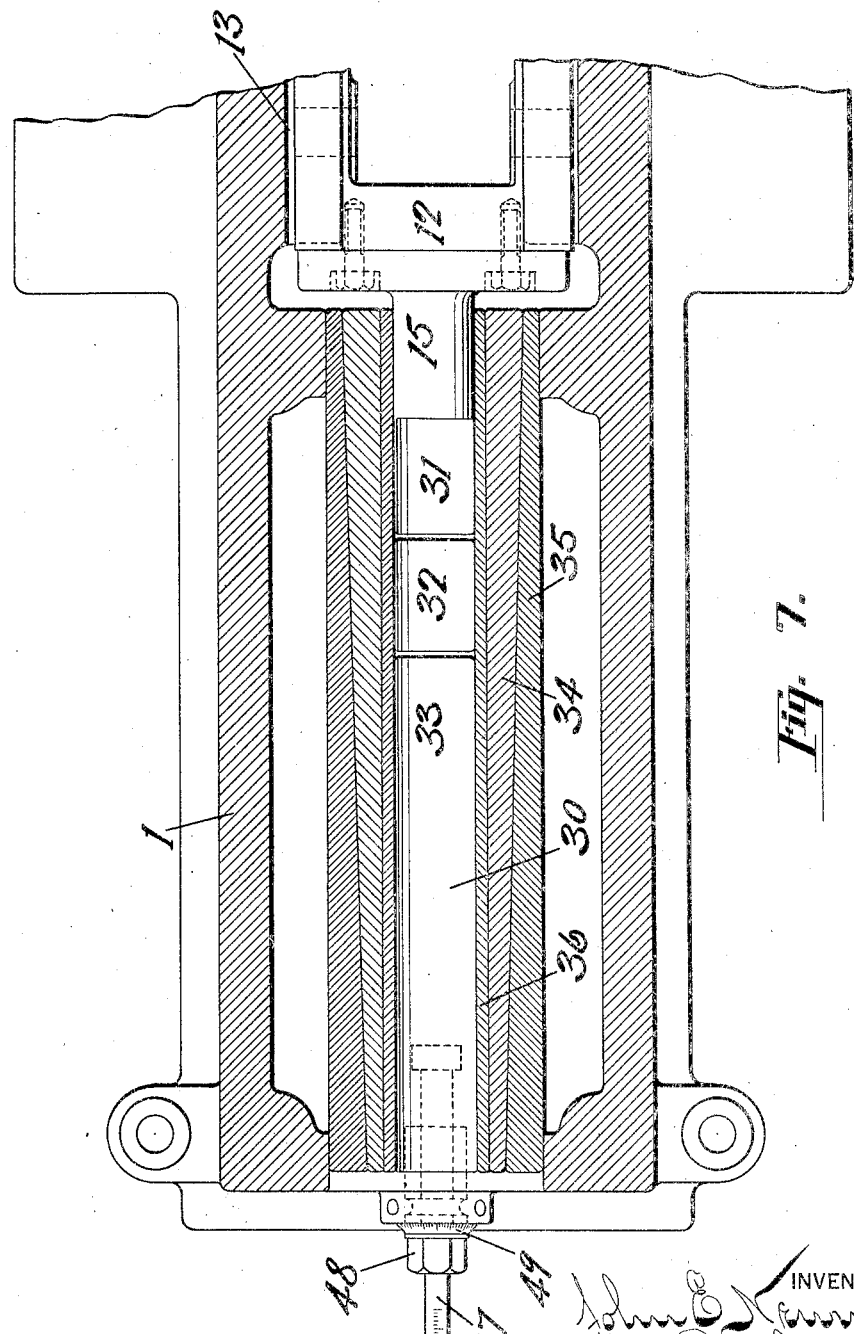

Patented Oct. 2, 1923.

1,469,429

UNITED STATES PATENT OFFICE.

JOHN E. NEUMAIER, OF DAYTON, OHIO, ASSIGNOR TO THE LIGNITE PRESSED COAL COMPANY, OF DAYTON, OHIO, A CORPORATION OF OHIO.

MOLDING PRESS.

Application filed February 1, 1922. Serial No. 533,439.

*To all whom it may concern:*

Be it known that I, JOHN E. NEUMAIER, a citizen of the United States, residing at Dayton, in the county of Montgomery and State of Ohio, have invented certain new and useful Improvements in Molding Presses, of which the following is a specification.

My invention relates to molding presses and more particularly to a press for briquetting lignite by utilizing the inherent properties of the material to effect cohesion in the formed blocks or briquets in lieu of artificial or added binder.

Lignite is an imperfectly formed coal or one in which the natural process of transformation has been incomplete. It is found in large deposits widely distributed and while not confined to any particular geological formation is most abundant in the more recent strata, particularly tertiary formation whereas the true coal is usually found in deposits of the carboniferous age. In its general chemical composition it occupies a place midway between coal and vegetation. Lignite usually contains a considerable proportion of hygroscopic water, and decidedly more oxygen than true coal. It also contains certain light oils, creosote and a proportion of pitch, as well as other more or less volatile by-products. In its natural state it is much inferior to true coal as fuel and materially less combustible. Under the usual methods of briquetting it is unstable, possessing a tendency to disintegrate or crumble and is of low combustibility. However, when specially treated and formed into compressed blocks or briquets as hereinafter described, it not only affords a highly efficient fuel, but one of very convenient form for general purposes, which will retain its shape and high combustion under all conditions.

The present invention pertains to a simple economical and convenient form of molding apparatus, by which lignite and like material may be formed into compact solid briquets which will retain their form, and will not readily disintegrate under atmospheric and temperature influences.

The object of the invention is to simplify the structure as well as the means and mode of operation of plastic molding apparatus whereby it will not only be cheapened in construction but will be more efficient in use, positive in operation, uniform in action, rapid and unlikely to get out of repair.

A further object of the invention is to provide an improved form of automatic press wherein the charges are automatically measured to predetermined proportions and further to provide a form of die wherein the material is subjected not only to external pressure in one direction, but also to contraction by which the material is condensed and solidified and to further provide means for heat treating the material during its compression.

A further object of the invention is to provide improved adjusting means for the forming die by which the relative proportion of the product may be varied at the will of the operator.

A further object of the invention is to provide a compact apparatus of the toggle link type by which the material may be subjected to maximum pressure.

With the above primary and other incidental objects in view as will more fully appear in the specification, the invention consists of the features of construction, the parts and combinations thereof, and the mode of operation, or their equivalents as hereinafter described and set forth in the claims.

Figure 2:
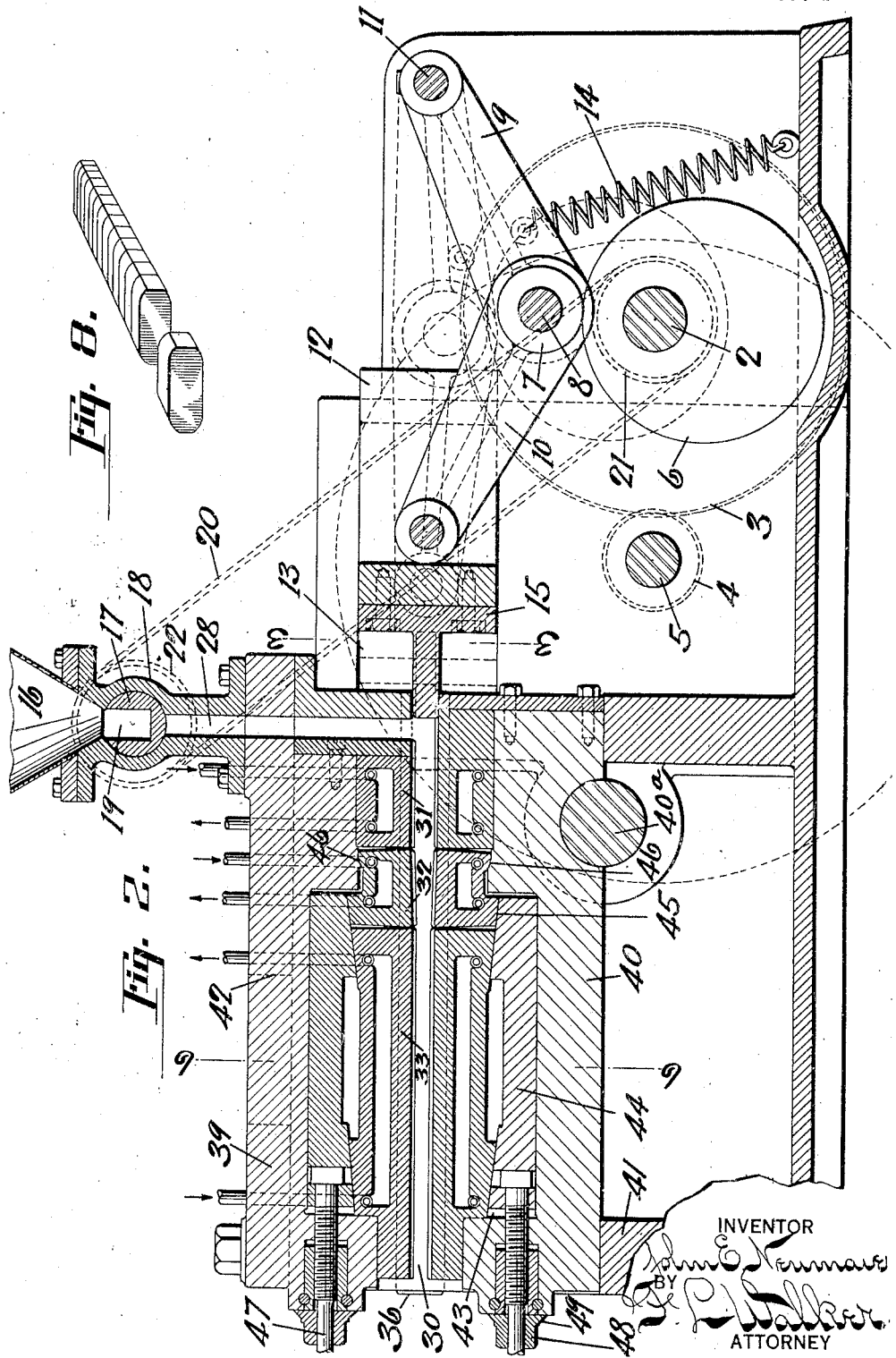
Figure 3:
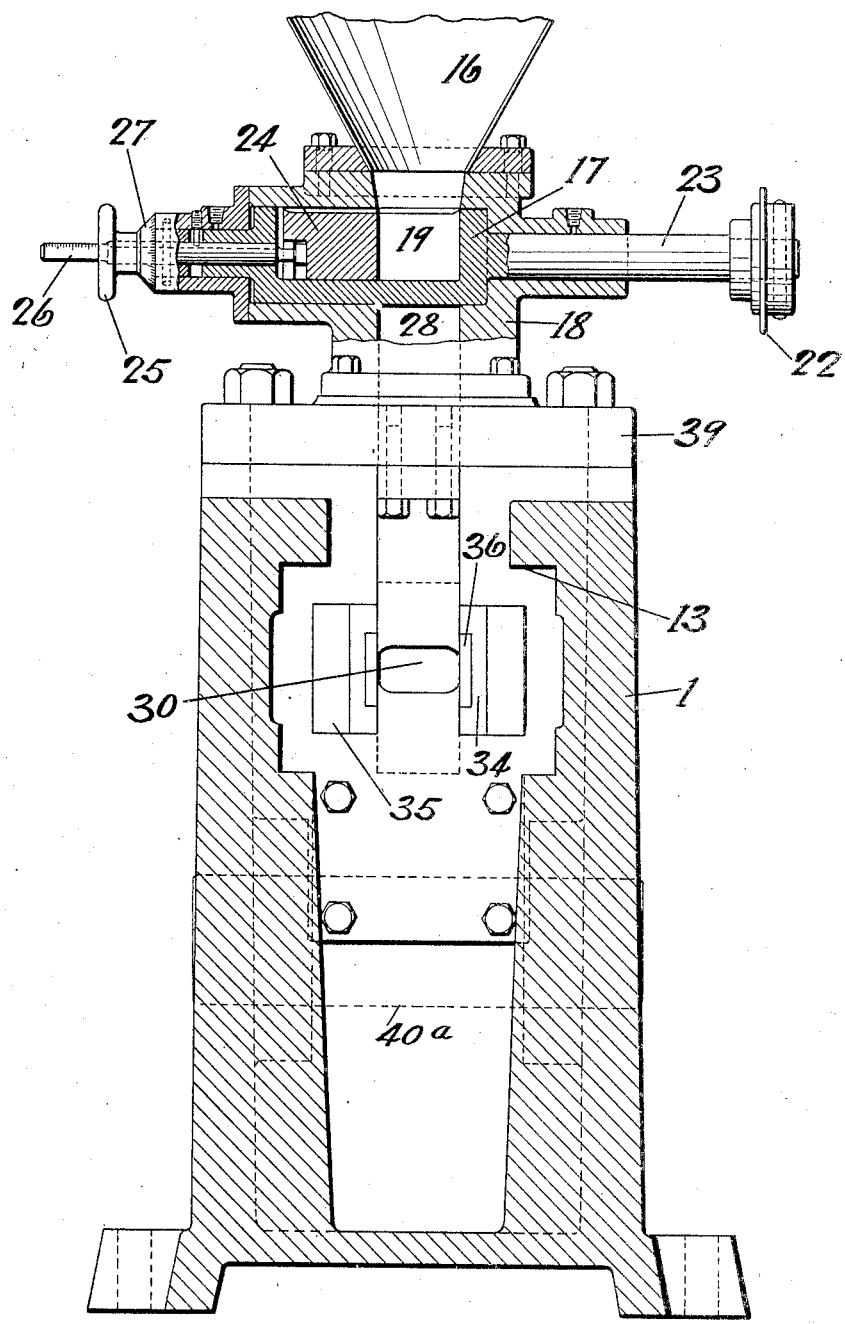
Figure 4:
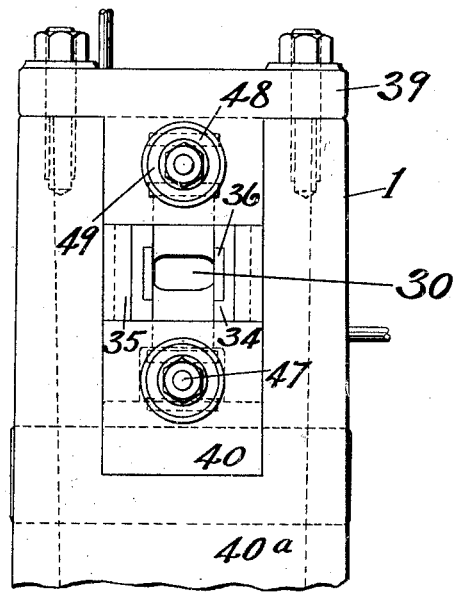
Figure 6:
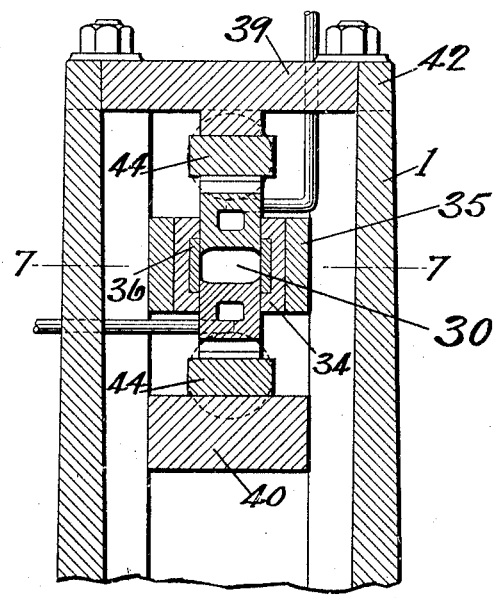

In the accompanying drawings, wherein has been shown the preferred, but obviously not the only form of the invention, Fig. 1 is a top plan view of the assembled press or briquet forming apparatus forming the subject matter hereof. Fig. 2 is a vertical sectional view on the medial line of Fig. 1. Fig. 3 is a transverse sectional view on line 3—3 of Fig. 2. Fig. 4 is an end elevation viewed from the left of Figs. 1 and 2. Fig. 5 is an enlarged detail sectional view of the briquet forming die and adjusting means therefor. Fig. 6 is a transverse vertical sectional view on line 6—6 of Fig. 2. Fig. 7 is a longitudinal sectional view on line 7—7 of Fig. 6. Fig. 8 is a detail perspective view of the product.

Like parts are indicated by similar characters of reference thruout the several views.

The use of lignite as fuel has not become general due to unsatisfactory methods of briquetting and the unstable character of the product. The briquetting of the material as heretofore practiced without first removing the excessive moisture and light oils has caused the material to crumble or disintegrate and has materially lowered its combustibility. The present apparatus is primarily intended for compressing the material after it has been previously treated or processed. In a general way this process is grinding or pulverizing the lignite and subjecting it to heat by which the water and light oils are dispelled as well as the gases and other volatile matter. A proportion preferably approximately one third of the material is subjected to a higher degree of heat by which the creosote and pitch or tar is separated, leaving in this portion of the material substantially only the fixed carbon. The material is then cooled and remixed, the creosote and separated pitch or tar being returned to the mixture as is also a small proportion of moisture. The preferably moisture contents is approximately seven per cent. This is more accurately determined by evaporating all of the moisture and then returning the desired proportion, rather than evaporating to a less extent with the purpose of leaving the desired seven per cent of moisture. Moreover, by removing all of the water and then returning the proportion desired, such moisture can be more evenly distributed in the mass. Upon returning the creosote and tar or pitch to the mixture, the latter will not again combine with the carbon, but will merely form a mixture therewith. It is this mixture of dehydrated lignite to which have been returned a small per centage of the moisture and the extracted creosote and pitch in a free state, that is to be treated in the present apparatus. It will be understood, however, that the apparatus is not limited to this use alone, but may be applied to the compression of other plastic or semi-plastic material, or to the briquetting of lignite or other forms of fuel subjected to other prior treatment process or with the use of other binder. The treatment of the lignite forms no part of the present invention and is here stated not with any intent of limiting the range of usefulness of the present apparatus, but for the purpose of illustrating one of its applications.

The die press or briquetting apparatus forming the subject matter hereof is mounted in a main frame having parallel vertically disposed side walls 1—1 between which the operative parts of the apparatus are located. Adjacent to one end of the main frame there is journalled in the side walls 1 a transversely arranged main drive shaft 2, actuated from any suitable source of power as for instance by means of gears 3 and 4 from a power shaft 5. The main shaft 2 carries an eccentric 6, which rotates in unison with the main shaft 2, and operatively engages a roller 7, carried loosely upon the medial trunnion stud 8 of a pair of toggle links 9 and 10. The link 9 is pivoted at 11 in the main frame, while the link 10 is pivotally connected with a reciprocating head 12, mounted in suitable guides 13 formed in the side walls of the main frame. The eccentric 6 in its rotary movement elevates the joint of the toggle thereby straightening the link and thrusting the reciprocatory head toward the left in Fig. 2. The links 9 and 10 are sufficiently heavy that they will follow the eccentric 6 in its retrograde movement. However, should the weight be insufficient and to prevent lost motion or play between the eccentric 6 and the roller 7 a retracting spring 14 may be provided against the tension of which the eccentric will elevate the link and which by its retraction will flex the link and retract the reciprocatory head. The reciprocatory head 12 actuated to and fro by the movement of the toggle links 9 and 10 carries a plunger 15, which coacts with a series of dies hereafter described to compress the material upon the outward thrust of the reciprocatory head 12.

The previously treated lignite or other material to be compressed is fed into a hopper or receiver 16 located on the top of the apparatus. At the bottom of this hopper is a rotary measuring head 17. The measuring head 17 is enclosed in a suitable casing 18 mounted in the top of the structure and comprises a cylindrical body having therein a recess or pocket 19 intermittently brought into communication with the hopper 16 by the rotation of the measuring head. This charge measuring device is automatically actuated by a driving chain or belt 20 extending from a suitable sprocket 21 upon the main shaft 2 to a corresponding sprocket 22 carried upon the shaft extension 23 of the measuring head. In order that the capacity of the charge measuring head may be varied at will, and hence the size of the briquet accurately determined, there is provided within the pocket or recess 19 in the measuring head an adjustable end wall 24. This end wall is adjustable to and fro within the pocket or recess 19, by means of an adjusting wheel 25 operatively engaged with a screw threaded stem 26. There is provided adjacent to the adjusting wheel a series of graduations 27, by which the capacity of the charge measuring head is determined by various adjustments of the wheel. The measuring head 17 in its rotation receives a charge of material from the hopper 16 as the pocket 19 passes its upturned position and upon further rotation assuming an inverted position it discharges its contents down a throat or chute 28, which leads to a point of operation immediately in advance of the plunger 15 when the latter is in its retracted position.

By the repeated reciprocation of the plunger 15 successive charges are compressed each against the other and so progressively forced thru an elongated passage 30, constricted or reduced at a medial point and formed by a succession of dies. In the form of apparatus illustrated in the drawing, there are three of these dies, to wit; the initial or primary die 31, an intermediate or secondary die 32, and a third or final die 33 of somewhat greater length. It will be obvious that the passage 30 might be extended to any desired length by either increasing the length of the respective dies or increasing their number. The dies each comprise two sections, an upper and lower member, the adjacent faces of which are concave as shown in Figs. 4 and 6. The dies shown are shaped to produce a briquet or block of the general proportion and shape shown in the detail perspective view Fig. 8. However, the shape or contour of the briquets is immaterial and while an oval form or one having the shape of a parallelogram with rounded corners is to be preferred, any other shape or proportion may be produced by correspondingly changing the shape of the adjacent faces of the die.

The respective sections of the initial die 31 may be relatively fixed in relation with each other, and in such spaced relation as to agree with the proportion of the reciprocatory plunger 15. The die members being spaced apart the side walls of the passage 30 intermediate such guides are formed by oppositely disposed pairs of tapered or wedge shaped plates 34 and 35. The several die sections forming the dies 31, 32 and 33 are arranged end to end with the wedge plates 34 and 35 oppositely disposed in reversed relation on opposite sides of the die units. The innermost wedge plates 34 are provided upon their inner faces with inlaid hardened steel plates 36 which form the side surfaces of the die passage 30 to resist the wear and compression of the material therein. The several dies and wedge plate are mounted in upper and lower die supporting members 39 and 40, each so interlocked or interengaged with the main frame as to resist the thrust of the plunger. The lowermost die support 40 rests upon a transverse shaft 40ᵃ, securely mounted in the side walls 1 of the main frame, and engaging in an inverted semicircular notch or groove in the bottom of the supporting member 40. At the rear or outlet end of the machine, this support 40 rests upon a transverse ledge or end wall 41 of the main frame.

The upper die support 39 rests upon the upper edges of the side walls 1—1 of the main frame, which walls have a medially projecting tongue or elevated lug 42 engaging in corresponding notches or recesses in the margins of the upper supports 39. This interlocking engagement of the upper support 39 with the side walls 1 by means of the tongue or lug 42 serves to resist the end thrust or transmit the same to the frame of the machine, while the engagement of the lower support 40 with the transverse shaft 40ᵃ takes the end thrust upon the lower member.

While as before stated the primary or initial die 31 is of constant size corresponding to that of the plunger 15, the sections or units forming the secondary and final die are relatively adjustable to and from each other to vary the capacity or cross sectional area of the passage 30. The members or units of the final die 33 are movable directly to and from each other, while the units or members of the intermediate or secondary die 32 are capable of a tilting movement whereby they are caused to converge to greater or less degree. Means is provided for adjusting the units or members of the secondary and final dies, in unison with each other whereby the convergence or angularity of the relation of the secondary die units or members will agree at one end with the primary or initial die 31 and at the other end with the passage intermediate the final or third die 33.

To effect this adjustment of the die members, the upper and lower die supports 39 and 40 are provided with opposite disposed recesses as at 43. Located in these recesses are longitudinally movable wedge bars 44 having inclined cam faces agreeing with like inclined cam faces upon the exterior or outer surfaces of the die members 33 and 32. The elongated final die 33 is provided with these spaced cam faces adjacent to its opposite ends so that upon the longitudinal movement of the wedge bars 44, the members of the die 33 will move uniformly inward. The intermediate or secondary die is provided with like inclined cam faces 45 adjacent to its rearward or discharge end, which are engaged by the inclined cam faces of the wedge bars 44, simultaneously with their engagement with the units or members of the elongated final die 33. The outer faces of the units or members of the secondary intermediate die 32 are formed arcuate as at 46 adjacent to their inner or receiving end. These arcuate faces agree with similar arcuate or concave surfaces upon the inner or adjacent faces of the die supporting members 40 and 39, thereby guiding the die unit 32 in an oscillatory movement under the influence of the wedge bar 44, in which they oscillate or pivot about their inner forward corners. There is sufficient clearance provided between the juxtaposed faces of the successive dies to accommodate this oscillatory movement to inclined or converging relation of the die units. It will be understood that during such adjusting movement the passage 30 is filled with material under compression, which tends to resist the movement and hence hold the die units in their outermost position. The inward adjustment under the influence of the wedge bars is against the resistance of such material. No means is necessary to effect the outer adjustment or return of these die units, since upon the withdrawal of the wedge bar 44 the compression of the material within the passage 30 will be sufficient to force the die units or members outwardly until arrested by their engagement with the inclined faces of the wedge bar, or the engagement of the wedge bar with the longitudinal walls of the recesses 43 as the case may be. The adjustment of the intermediate or secondary die and with it the final die 33, effects a contraction of the passage 30 at a medial point by converging or tapering the passage from the capacity or cross area of the initial die 31 to that of the final or elongated die 33. The wedge bars 44 are actuated to adjust these die units or members, and the degree of adjustment and consequent convergence of the passage 30 is effected by adjusting screws 47 suitably mounted in the ends of the die supporting members 40 and 39 and having operative engagement with the wedge bars 44, by which said bars may be reciprocated within the recesses 43. These adjusting screws are provided with external adjusting nuts 47 and 48, coacting with graduated heads 49 to determine the degree of adjustment and insure uniform and equal adjustment of the upper and lower die members. Moreover, by means of the graduated head 49 the capacity of the passage 30 and consequent proportion or size of the briquet may be predetermined. The several units or members comprising the dies 31, 32 and 33, are hollow or chambered and are provided with inlet and outlet conduits. Superheated steam or other heating medium is circulated thru the primary or initial die units and also those of the secondary or intermediate die. Such heating medium is preferably introduced adjacent to the forward or right hand side of the die as shown in Fig. 2, and discharged from the opposite side of the die or that adjacent to its discharge end. By this means the dies 31 and 32 as well as the adjacent portions of the apparatus, including the throat 28 and plunger 15 are heated. This heat afforded by the circulation of heating medium thru the dies together with the heat generated by the compression and the friction of the product within the passage softens the material and renders it semi-plastic. The charge of material drops from the measuring head 17 thru the throat 28 and is thus brought into a warmed or heated area and is subjected to the pressure of the reciprocating plunger 15. This plunger forces the charge into the initial or primary die 31 against the resistance of the body of material already compressed within and extending thruout the length of the passage 30. The heat to which the material is subjected together with the compression afforded by the plunger causes the particles of material to cohere in a compact mass wherein the pitch or tar previously separated and subsequently returned to the mass serves in a sense as a binder, while the separated pitch or tar under the influence of the compression is caused to exude or be squeezed out of the mass compressed within the die to the surface thereof, where it forms a smooth nonporous surface. This exudation of the pitch further serves as a lubricant assisting in the movement of the body of lignite thru the passage. While the material compressed within the elongated passage 30 forms a continuous core made up of successive separately compressed charges, the material forming each charge will unite into a homogenous mass or blocks and while the bodies comprising each successive compressed charge will adhere one to the other, there will be a definite and distinct line of cleavage between the successive compressed charges upon which they will subsequently separate after their discharge from the machine.

As each incoming charge is compressed by the advance of the plunger 15, the entire mass or core of material within the passage 30 is advanced a distance equal to the thickness of the compressed body or briquet. Thus a particular briquet or compressed body will advance thru successive stages step by step as additional bodies are added to the initial end of the core. The initial die 31 is of sufficient length and the body therein is advanced thru alternating periods of movement and rest sufficient to permit it to become thoroughly warmed or heated during such passage. While it is formed into a briquet or body upon the initial compression by the plunger 15, it will be understood that at each successive operation, the body is further compressed by the addition thereto of other like bodies or briquets by which it is forced step by step thru the dies. As the formed body or briquet passes from the initial die 31, into the contracting die or medial die 32 it is not only subjected to axial pressure under influence of the plunger transmitted thru several intermediate like bodies of briquets, but by being forced thru the tapered or restricted passage it is subjected to external or lateral pressure from above and below due to the inclination or convergence of the secondary die members. This contraction of the already compressed body serves to further solidify and condense the material causing the semi-fluid pitch to be brought to the surface by the intense internal pressure, thus serving to seal or water-proof the surface of the product and securely hold the fine particles and dust rendering the final product cleanly. Like the initial die 31, the secondary die is also heated by the circulation of live steam passing thru the inlet and outlet conduits as indicated by the arrows or darts in Fig. 2. The contraction of the secondary die further affords a yielding abutment or yielding resistance against which the plunger 15 operates. It will be understood that the more constricted the passage thru the secondary die the greater will be the compression afforded by the plunger and the greater power required to move the entire core thru the passage 30. Having passed thru the intermediate or secondary die by which the compressed body or briquet is contracted and its density increased, it passes thence between the units or members of third or final die 33. Instead of being heated, this die is a cooling die. Cold water or other chilling or condensing medium is circulated thru the chamber of the die members or units 33 preferably entering the die at the end adjacent to the outlet and exhausting at the forward end adjacent to the secondary die 32. This arrangement of circulation prevents a chilling of the secondary or intermediate die and affords a gradual reduction in temperature as the briquet is advanced step by step thru the passage. The cold water being conducted in a direction opposite to the passage of the briquet thru the passage 30 gradually absorbs more and more heat until at the forward or initial end of the die it is approximately the same heat as the secondary or intermediate die, whereas at the outer or discharge end the die is comparatively cold. The purpose of so cooling or chilling the product is to set or harden the pitch, which forms the waterproof envelope as well as to harden or set the body of such compressed material thruout and particularly to condense any particles of steam or gases resulting from moisture within the compressed body. If such entrapped particles of moisture or minute bodies of steam or gas were not condensed by being cooled or chilled before the pressure upon the product is relieved by its discharge from the passage 30, the subsequent expansion of such fluid bodies might cause the rupture of the briquet or at least induce such internal strains as might lead to the subsequent disintegration of the briquetted material. While the material will leave the apparatus in a warm or partial heated condition, the influence of the final die or chilling die will be sufficient to condense any fluid or gaseous bodies to a nondangerous stage. This product as it is discharged from the final die will be in the form of a core having therein definite lines of cleavage between the successive compressed charges upon which the core will separate into individual briquets having a transverse area or contour agreeing with that of the final die and having a thickness determined by the size of the charge or capacity of the measuring head 17. Without changing the relation of the die members, the thickness of the briquet may be regulated by adjusting the variable end wall of the measuring pocket 19. Likewise with uniform charges the dimensions of the briquet may be varied by the adjustment of the die units. Likewise this adjustment of die units whereby the convergence of the intermediate or secondary die 32 is varied and with it the capacity of the final die 33, varies the resistance to the movement of the core within the passage 30, and consequent compression effected by the plunger 15. The product is preferably conveyed from the apparatus upon any suitable traveling conveyor of suitable length to permit the formed briquet to become thoroughly cooled.

The resulting product will be a hard, dense, highly combustible block having the characteristics of hard coal. The surface will be smooth and glossed by its frictional contact with the faces of the successive dies and will be nonporous and moisture resistant. The product will resist the disintegrating influence of both moisture and temperatures.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a molding press, presser means and a die within which the material is compressed, a hopper for the material, a rotary head having a pocket therein intermittently brought into communication with the hopper by the rotation of the head, a movable end wall for said pocket, a screw threaded stem extending axially with said head and operatively connected with said adjustable end wall for adjusting the same to vary the capacity of the measuring head.

2. In a molding press, presser means and a die within which the material is compressed, a hopper for the material, a rotating bottom for said hopper having a charge measuring orifice therein, and means to vary the effective size of the charge measuring orifice including an adjusting screw and a graduated head by which the capacity of the measuring orifice is indicated.

3. In a molding press, presser means, a die in which the material is compressed and a rotary charging device having a measuring pocket therein discharging into the die in advance to the presser member, an adjustable stem extending axially from the rotary charging device, and means controlled by the adjustment of the stem for varying the capacity of the measuring pocket.

4. In a molding press the combination with presser means of a tubular die means comprising an initial section having relatively fixed walls, an intermediate section having angularly disposed walls capable of adjustment to different degrees of divergence, and a final section having relatively adjustable substantially parallel walls.

5. In a molding press, the combination with presser means, of a tubular die including two sections having relatively adjustable walls, and means for adjusting the walls of one section angularly and the other section in parallel relation simultaneously.

6. In a molding press, the combination with presser means of a tubular die having relatively adjustable walls, and means for variably converging the walls thruout a portion of their extent and adjusting the remainder of the walls to variable spaced parallel relation agreeing with one end of the converging portion of the tube.

7. In a molding press, the combination with presser means of a tubular die, having relatively adjustable walls, and means for relatively adjusting the walls thruout a portion thereof and for simultaneously converging an adjacent portion of the walls to agree with the spacing of such parallel portion.

8. In a molding press, the combination with presser means, of a tubular die divided into a plurality of sections, including an initial section of permanent cross area capacity, a final section of variable cross area capacity and an intermediate adjustable section converging from the cross area capacity of the initial section to that of the final section, and means for adjusting said sections.

9. In a molding press, the combination with presser means, of a tubular die, having an initial section and a final section of different cross area capacities, and an intermediate converging section tapering from the cross area of the initial section to that of the final section, and means for varying the relative cross area capacities of the respective sections.

10. In a molding press, the combination with presser means, of a tubular die comprising two pair of oppositely disposed wedge plates such pairs of plates being spaced one from the other, and relatively adjustable top and bottom die members interposed between said pair of wedge plates and yieldingly clamped in spaced relation by the adjustment of said wedge plates.

11. In a molding press, the combination with presser means, of a tubular die having relatively adjustable walls, external cam faces on the said adjustable walls, and adjusting members relatively adjustable in relation with said walls while engaging said cam faces to move the walls.

12. In a molding press, the combination with presser means, of a tubular die having relatively adjustable walls, and relatively movable adjusting members having cam faces thereon engaging the adjustable walls to vary said walls in relation with each other.

13. In a molding press, the combination with presser means, of a tubular die including two relatively adjustable units, supporting means upon which said die units have arcuate bearing surfaces, and adjusting means for oscillating said die units to vary their relation one to the other.

14. In a molding press, the combination with presser means, of a tubular die, including two oscillatory members movable to and from each other and means to adjust said members.

15. In a molding press, the combination with presser means, of a tubular die including two oscillatory members movable to and from each other, and a reciprocatory inclined bar engaging each of said oscillatory members to adjust them in relation one with the other.

16. In a molding press, the combination with presser means of a tubular die including two relatively adjustable parallel wall members and means to adjust said wall member in relation with each other while maintaining their parallel relation.

17. In a molding press, the combination with presser means of a tubular die including two relatively adjustable parallel wall members and a reciprocatory cam bar engaging each of said members to adjust them in relation one with the other while maintaining their parallel relation.

18. In a molding press the combination with presser means of a tubular die including two relatively adjustable parallel wall members, each having cam faces therein, and longitudinally movable adjusting bars engaging said cam faces to vary the spaced relation of said members one with the other.

In testimony whereof, I have hereunto set my hand this 20th day of October A. D. 1921.

JOHN E. NEUMAIER.

Witnesses:
DAVID A. KERSTING,
GEORGE C. HELURIG.